(12) United States Patent
Bergsma

(10) Patent No.: US 8,025,260 B2
(45) Date of Patent: Sep. 27, 2011

(54) SAMPLE DEVICE WITH TURNTABLE

(75) Inventor: Felix Bergsma, Peron (FR)

(73) Assignee: European Organisation for Nuclear Research—CERN, Geneva (CH)

(*) Notice: Subject to any disclaimer, the term of this patent is extended or adjusted under 35 U.S.C. 154(b) by 1351 days.

(21) Appl. No.: 10/585,167

(22) PCT Filed: Dec. 30, 2003

(86) PCT No.: PCT/EP03/14965
§ 371 (c)(1),
(2), (4) Date: Nov. 15, 2006

(87) PCT Pub. No.: WO2005/064225
PCT Pub. Date: Jul. 14, 2005

(65) Prior Publication Data
US 2007/0159163 A1 Jul. 12, 2007

(51) Int. Cl.
*A47F 5/00* (2006.01)
(52) U.S. Cl. .......... 248/125.8; 74/417; 74/423; 248/127
(58) Field of Classification Search .................. 248/694, 248/292.13, 200, 127, 183.4, 176.1, 183.1, 248/125.8; 74/417, 423
See application file for complete search history.

(56) References Cited

U.S. PATENT DOCUMENTS

| | | | |
|---|---|---|---|
| 3,657,941 A * | 4/1972 | Engler | 74/417 |
| 5,319,418 A * | 6/1994 | Fujimoto et al. | 399/167 |
| 6,234,037 B1 * | 5/2001 | Zimmer | 74/421 A |
| 2004/0237684 A1 * | 12/2004 | Bossler | 74/423 |
| 2006/0164073 A1 | 7/2006 | Bergsma | |

FOREIGN PATENT DOCUMENTS
DE  44 31 494 A1  3/1996
FR  2 704 050 A1  10/1994

* cited by examiner

*Primary Examiner* — Ramon Ramirez
(74) *Attorney, Agent, or Firm* — Christensen O'Connor Johnson Kindness PLLC

(57) ABSTRACT

A sample device to be inserted inside an external tube, having a substantially circular cross-section, may carry a substantially circular plate as part of a turntable to be rotated within the external tube around two substantially orthogonal axes. An embodiment of the sample device may include two substantially coaxial tubes, with the turntable being supported by the outer tube, and two meshing gears, with the first gear being connected to the inner tube and the second gear being connected to the turntable. Another embodiment may include a special cable guide being connected with its first end with the turntable and its second end, being substantially perpendicular to the first end, with the supporting means, with the inner tube, the outer tube and/or the cable guide being connected with a driving unit. Preferably, the surface of the plate to be rotated within the external tube is maximized.

46 Claims, 3 Drawing Sheets

SAMPLE DEVICE WITH TURNTABLE

BACKGROUND

The present invention refers to a sample device with a turntable. Such a sample device is, for example, described in the not pre-published international patent application PCT/EP02/07226 of the applicant as part of a magnetic calibration device. A corresponding U.S. patent application has been published as U.S. Patent Application Publication No. 2006/0164073.

SUMMARY AND INITIAL DESCRIPTION

An embodiment of the present invention provides a sample device with a turntable which has a maximized surface fitting inside an external tube with a substantial circular cross-section.

In an embodiment, a sample device suited to be inserted inside an external tube with a radius $r_{max}$ comprises a turntable with a substantially circular plate having a radius $r_{table}$, a rotator for rotating said turntable around two substantially orthogonal axes, two substantially coaxial tubes, the turntable being supported by the outer tube, and two meshing gears, the first gear being connected to the inner tube and the second gear being connected to the turntable, the first gear having a radius $r_{gear1}$, the second gear having a radius $r_{gear2}$ and the inner tube having a radius $r_{inner\ tube}$ such that $$r_{table} \leq r_{max} - d\sqrt{\left(1+\frac{1}{n^2}\right)},$$

with d being the gear thickness and n being the gear transmission ratio.

In a further embodiment, the sample device comprises in addition at least one first cable guide having a first end connected to the turntable and the second end connected to a cable support.

The cable support may be guided by the outer tube and/or connected to at least one synchronizing means and/or at least one first driving unit.

In another embodiment, a sample device suited to be inserted inside an external tube with a radius $r_{max}$ comprises a turntable with a substantially circular plate having a radius $r_{table}$, a rotator for rotating said turntable around two substantially orthogonal axes, at least one supporting means for supporting the turntable, and at least one first cable guide having a first end connected to the turntable and the second end connected to a cable support, said cable support being connected to at least one first driving unit. The supporting means may comprise an outer tube.

An inner tube is coaxially arranged within the outer tube, preferably with at least one gear being arranged between the inner and the outer tube.

In one embodiment of the invention with the cable support being connected to at least one first driving unit, the sample device is characterized by two meshing gears, the first gear being connected to the inner tube and the second gear being connected to the turntable, preferably the first gear having a radius $r_{gear1}$, the second gear having a radius $r_{gear2}$ and the inner tube having a radius $r_{inner\ tube}$ such that $$r_{table} \leq r_{max} - d\sqrt{\left(1+\frac{1}{n^2}\right)},$$

with d being the gear thickness and n being the gear transmission ratio.

It is further proposed that the cable support is guided by the supporting means, in particular the outer tube, and/or is connected to at least one synchronizing means.

It is further proposed that the gear thickness d is the thickness of the first or second gear, preferably corresponding to the thickness of the inner tube.

Also proposed is that the gear transmission ratio n corresponds to $r_{inner\ tube}/r_{gear}$, with $r_{gear}=r_{gear1}$ or $r_{gear2}$, preferably $r_{gear1}=r_{gear2}$ and/or $r_{gear1}=r_{inner\ tube}$.

In a preferred embodiment, the first cable guide comprises at least one first bellow and/or spring, preferably between the two ends of the cable guide. In a particular embodiment, the first end may be arranged substantially perpendicular to the second end.

It is further proposed that the first bellow and/or spring is guided by a support, preferably connected with the outer tube.

Also proposed is that the cable support is provided with at least one external second bellow and/or spring.

Further, the inner tube and/or the outer tube may be connected to at least one second driving unit.

In a preferred embodiment, the sample device is characterized in that the rotator comprises the inner tube, the outer tube and/or the cable guide connected to at least one driving unit. The at least one driving unit may be the first and/or second driving unit(s).

It is proposed that the driving unit, in particular the first and/or second driving unit(s), comprises at least one stepper engine and/or at least one worm wheel and/or at least one gear.

Also proposed is that the outer tube is provided with at least one axial extension for supporting the turntable.

It is preferred that the extension is provided with at least one recess for carrying at least one first bearing and/or the cable guide, the turntable, in particular a rotation pin connected to the substantially circular plate, and/or the cable guide is/are mounted within at least one first bearing.

It is also proposed that the outer tube is provided with two opposite extensions for carrying at least two rotation pins.

Embodiments of the sample device described herein can also comprise a second bearing between the inner tube and the outer tube.

It is possible that the first and second gears are formed as tooth or roll gears, and/or the first and second gears are formed as straight and/or conical gears.

Also proposed is that the first gear is machined on or mounted on the inner tube, and/or the second gear is machined on or mounted on the turntable, in particular a support extending substantially perpendicular to the plate and/or substantially coaxially to at least one rotation pin.

It is proposed that the inner tube is made from carbon fiber and/or provided with chrome plated teeth, and/or the turntable is made from carbon fiber and/or provided with chrome plated teeth.

Also proposed is that the first and/or second gear is/are made of acethal.

Still further, it is proposed that the first and/or second bellow is/are made out of rubber, and/or the first and/or second spring is/are made out of non magnetic metal, preferably comprising copper, like copper beryllium, or plastic.

It is proposed that the sample device comprises at least one thermal isolation layer between the external tube and the outer tube, the thermal isolation layer preferably being evacuated.

The sample device of the invention can also comprise means for blowing a gas, in particular conditioned air, into the external tube, preferably the gas entering into the inner or outer tube and exiting the outer or inner tube.

It is preferred that the sample device also comprises a control unit connected to the first and/or second driving unit.

In yet another aspect, at least one test object, at least one sample, at least one sensor, at least one mirror, at least one camera, at least one tool and/or at least one electronic device is/are, preferably detachably, attached to the turntable, in particular at least one side of the substantially circular plate, and/or connected with the control unit.

It is also proposed that the control unit is arranged remote from the turntable. Preferably, at least one cable, which may be guided at least partially within the first cable guide, is provided between the control unit and the turntable.

Still further, at least one second cable guide, preferably connected to the second end of the first cable guide, is proposed. The second cable guide may, in particular, be substantially flat and/or flexible.

In one embodiment, the sensor comprises at least one coil and/or at least one magnetic sensor, in particular for providing a magnetic calibration device.

In another embodiment, the sample device comprises a source for emitting radiation, preferably electromagnetic. The source may, in particular comprise a laser and/or a visible light source.

In this respect, it is preferred that the radiation is guided to the turntable, in particular to the mirror and/or camera, preferably within the inner tube. The radiation may be guided, in particular, via at least one glass and/or fiber-optic light guide or waveguide.

Finally, the sample device of the invention can be characterized in that the amount of turns of the inner tube differs from the amount of the turns of the outer tube by one turn within one measuring or calibration cycle.

Described herein are two approaches for optimizing the dimensions of a sample device to be inserted inside an external tube, having a substantially circular cross-section, with respect to the surface of a substantially circular plate of a turntable to be rotated within said external tube around two substantially orthogonal axes.

According to one alternative, there are provided two substantially coaxial tubes, with the turntable being supported by the outer tube, preferably by a support directly milled into the outer tube, and two meshing gears, the first gear being connected to the inner tube and the second gear being connected to the turntable, with the radius of the plate of the turntable being smaller than the radius of the external tube by an amount of only $\sqrt{(1+1/n^2)}$ times the gear thickness, in which n is the transmission ratio. The first gear can be machined on or mounted on the inner tube. In particular, in case the first gear is machined on the inner tube, the inner tube should be as thin as possible in order to provide a large as possible rotating surface of the turntable plate. Therefore, straight gears might be advantageous. The inner tube can be made from carbon fiber with chrome plated teeth at the driving to avoid wear with respect to a normal gear.

As a second alternative, a special cable guide may be used with its first end connected with the turntable and its second end with a supporting means which is in turn connected to a driving unit such that the turntable is driven via the cable guide.

A cable guide, in particular as the one used with the second alternative, can also be used in case of the employment of two substantially coaxial tubes in line with the first alternative. In either case, it is advantageous to have at least one bellow or spring provided between the two ends of the cable guide, one being connected to the turntable and the other being connected to a cable support. The bellow or spring forces the two ends of the cable guide to rotate at the same speed. This prevents the cable guided within the cable guide from winding up. If necessary, the bellow or spring can be guided by an additional support, in particular attached to the outer tube. Further, in particular when two substantially coaxial tubes are being used, the cable support can be synchronized to the rotation of said tubes from the outside to get less vibrations. In addition, the cable support can be prevented from rotation by an external bellow or spring.

The two driving tubes with the turntable can be put inside an external tube with a diameter of a few millimeters more than that of the outer driving tube for thermal isolation.

To save space, the return cable, connected to the turntable and partially guided within the cable guide, can be passed as flat cables or flex cables.

To keep a sample, test object or the like on the turntable at a constant temperature, conditioned air can be blown in one driving tube for leaving via the other driving tube.

The sample device according to the invention can be used in many different applications.

One of said applications is within a magnetic calibration device. In this case, on one side of the turntable plate there can be provided three coils and the respective electronics, and on the other side thereof the object to be tested or rather calibrated. Sample coils with only one adc and tripled sampling frequency can be used to gain further space. Also special coils, wound around a central point, with or without a Hall sensor inside, can be used. The diameter/height ratio of the coils can be chosen to get the best approximation of a point-like measurement. Chips to be used, in particular bare chips, can be directly bonded on a pc-board to gain further space. During measurement, a normalization integrated coil signal—$\sqrt{(B_x^2+B_y^2+B_z^2)}=1$ with $B_x$, $B_y$ and $B_z$ being the three spatial components of a magnetic field—can be corrected regarding non-orthogonality, self induction, offset, start position and/or bend width of electronics.

Coils can also be used to obtain the absolute value of the magnetic field to replace NMR measurements.

A further example of an application for a sample device of the invention is a directable borescope, namely a device for inspections through tiny holes. In this case, a normal fiber-optic borescope can be placed within the inner tube and a mirror can be placed on the turntable.

Also a laser pointer can be provided with a sample device of the invention, laser light shining through the inner tube onto a mirror on the turntable.

Another application of the sample device of the invention could be in connection with a camera, in particular a mini tv-camera, on the turntable. With this application, it can be recommended to only have one extension of the outer tube.

Still further, the sample device of the invention could be used within a manipulator which can pass through tiny holes or tubes. In this case, for example, a tool can be placed on the turntable. In case higher forces are necessary, larger gears can be employed within the sample device.

Of course, many other applications for a sample device of the invention are given.

DESCRIPTION OF THE DRAWINGS

The invention, together with further objects and advantages, may be best understood, by example, with reference to the following description of one embodiment taken together with the accompanying schematic drawings, in which.

DETAILED DESCRIPTION

Figure 1:
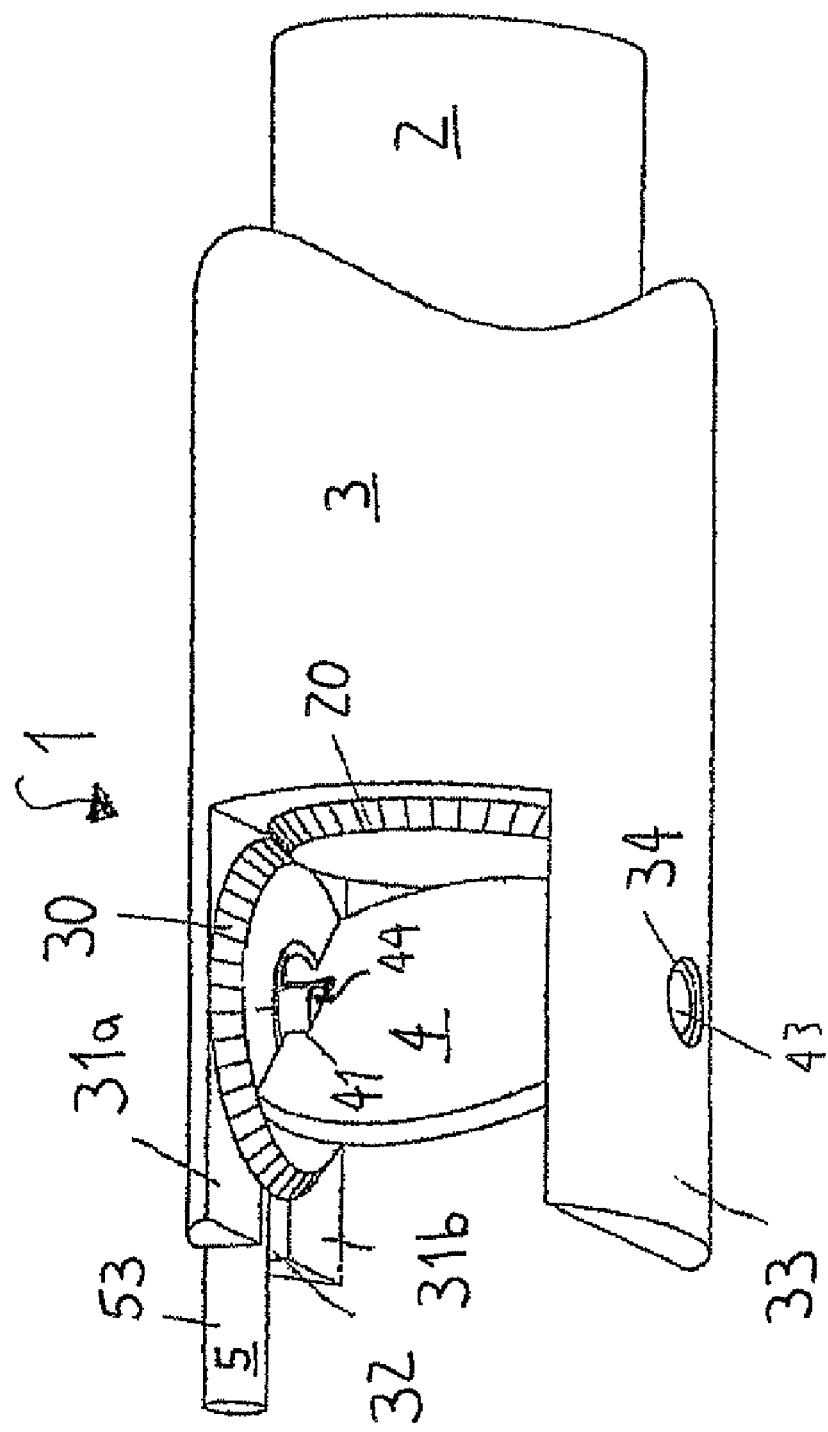
FIG. 1 is a perspective view of a part of a sample device with a turntable of the invention.

According to FIG. 1, a sample device 1 of one embodiment of the invention comprises an inner tube 2 arranged coaxially within an outer tube 3. A turntable 4 and a cable guide 5 are also provided.

Figure 2:
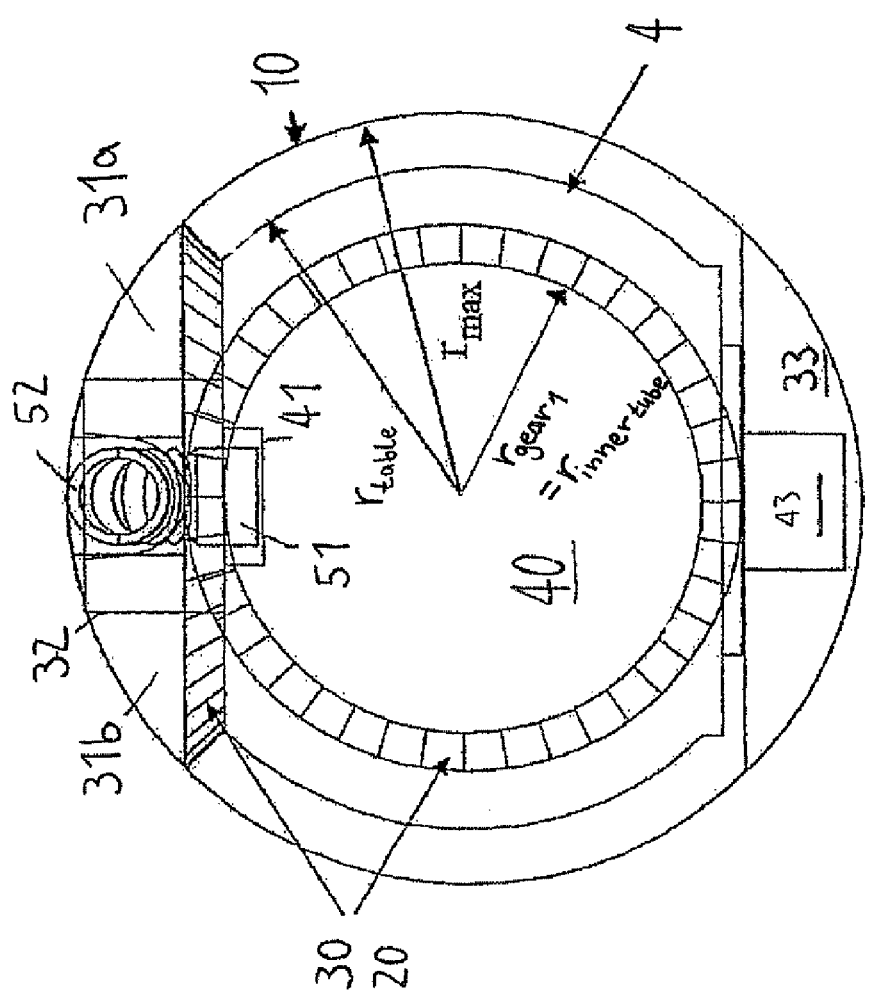
FIG. 2 is a cross-section taken parallel to a gear on an inner tube of the sample device of FIG. 1 with the turntable being arranged parallel to said gear.

On the inner tube 2 a first gear 20 is milled, whereas a second gear 30 is connected with the turntable 4. For that purpose, the outer tube 3 is provided with two first extensions 31a, 31b with a recess 32 for carrying a rotation pin 42 within a bearing 63 and a second extension 33 with a recess 34 to carrying a second rotation pin 43 within a bearing 62, as can be best seen in FIGS. 2 and 3.

Both rotation pins 42, 43 are part of the turntable 4 and rigidly connected with a substantial circular plate 40 having at least one recess 41 next to the cable guide 5. In addition, the turntable 4 comprises a support 44 rigidly connected to one of said rotation pins 42 and being milled with the second gear 30 meshing in the gear 20 on the inner tube 2.

Figure 3:
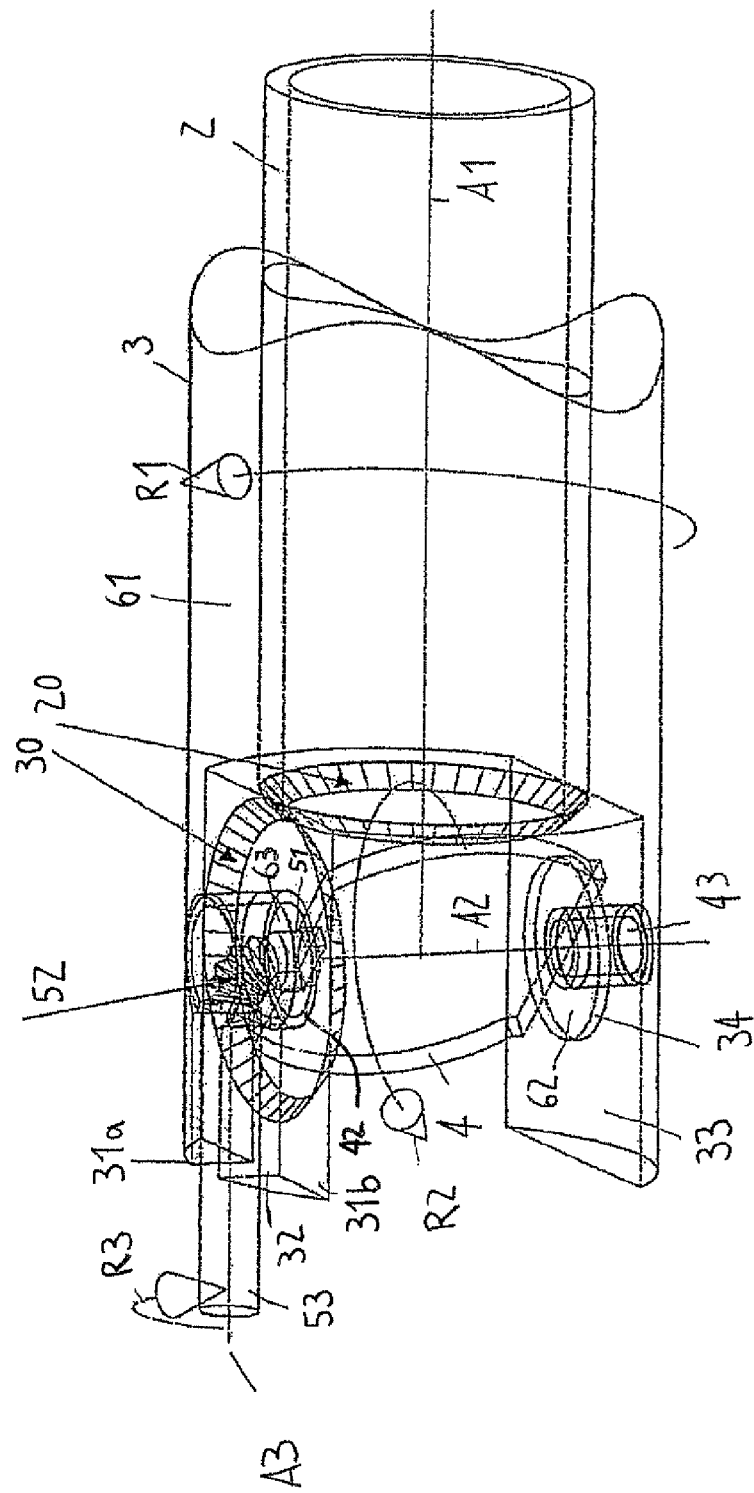
FIG. 3 is a perspective view as FIG. 1 showing internal parts in phantom.

The cable guide 5 comprises a guiding tube 51 coaxially extending within the rotation pin 42 and being connected with a guiding bellow 52 which, in turn, is connected to an additional guiding tube 53 extending substantially perpendicular to the first guiding tube 51, as can be best seen in FIG. 3. The first guiding tube 51 opens to the plate 40 within its recess 41 to facilitate entry of cables (not shown) from a sample or the like (not shown) mounted on the plate 40 into the cable guide 5.

In the illustrated embodiment, a further gear 61 is provided between the two tubes 2, 3.

In order to maximize the surface of the plate 40 within an external tube 10, into which the sample device 1 is inserted (see FIG. 2), the inner tube 2 should be as thin as possible, as the radius of the turntable 4 or rather its plate 40 should be smaller than the radius of the outer tube 3 by an amount of only $\sqrt{(1+1/n^2)}$ times the gear thickness, with n being the transmission ratio.

The plate 40 of the turntable 4 can take any orientation in space by choosing the right position of the two tubes 2, 3. A rotation of the inner tube 2 via a driving unit (not shown) around its longitudinal axis A1 in the direction R1 will lead to a rotation of the plate 40 in a direction R2 around an axis A2 being substantially perpendicular to the axis A1, whereas a rotation of the outer tube 3 via a driving unit (not shown) around its longitudinal axis A1 in the direction R1 will lead to a rotation of the plate 40 around the axis A1. Also, a rotation of the guiding tube 53 around its longitudinal axis A3 in the direction R3 will lead to a rotation of the plate 40 around the axis A2, whereas a rotation of the guiding tube 53 around the axis A1 will lead to a rotation of the plate 40 around the axis A1. The rotation of the guiding tube 53 can also be driven by a driving unit (not shown).

Although modifications and changes may be suggested by those skilled in the art, it is the intention of the application to embody within the patent warranted hereon all changes and modification as reasonably and probably within the scope of this contribution to the art. The features of the present invention which are believed to be novel are set forth in detail in the appended claims. The features disclosed in the description, the figures as well as the claims could be implemented alone or in any combination for the realization of the invention in its different embodiments.

REFERENCE SIGN LIST 1 sample device
2 inner tube
3 outer tube
4 turntable
5 cable guide
10 external tube
20 gear
30 gear
31a, 31b extension
32 recess
33 extension
34 recess
40 plate
41 recess
42 rotation pin
43 rotation pin
44 support
51 guiding tube
52 guiding bellow
53 guiding tube
61 bearing
62 bearing
63 bearing
A1 rotation axis
A2 rotation axis
A3 rotation axis
R1 rotation direction
R2 rotation direction
R3 rotation direction

The invention claimed is:

1. Sample device suited to be inserted inside an external tube with a radius $r_{max}$, comprising
a turntable with a substantially circular plate having a radius $r_{table}$,
a rotator for rotating said turntable around two substantially orthogonal axes,
two substantially coaxial tubes including an inner tube and an outer tube, the turntable being supported by the outer tube, and
two meshing gears, the first gear being connected to the inner tube and the second gear being connected to the turntable, the first gear having a radius $r_{gear1}$, the second gear having a radius $r_{gear2}$ and the inner tube having a radius $r_{inner\ tube}$ such that $$r_{table} \leq r_{max} - d\sqrt{\left(1 + \frac{1}{n^2}\right)},$$

with d being the gear thickness and n being the gear transmission ratio.

2. Sample device according to claim 1, further comprising at least one first cable guide having a first end connected to the turntable and the second end connected to a cable support.

3. Sample device according to claim 2, wherein the cable support is guided by the outer tube.

4. Sample device suited to be inserted inside an external tube with a radius $r_{max}$, comprising
a turntable with a substantially circular plate having a radius $r_{table}$,
a rotator for rotating said turntable around two substantially orthogonal axes,
at least one supporting means for supporting the turntable, and
at least one first cable guide having a first end connected to the turntable and the second end connected to a cable support, said cable support being connected to at least one first driving unit.

5. Sample device according to claim 4, wherein the supporting means comprises an outer tube.

6. Sample device according to claim 5, further comprising an inner tube that is coaxially arranged within the outer tube, with at least one gear being arranged between the inner and the outer tube.

7. Sample device according to claim 6, further comprising two meshing gears, the first gear being connected to the inner tube and the second gear being connected to the turntable, the first gear having a radius $r_{gear1}$, the second gear having a radius $r_{gear2}$ and the inner tube having a radius $r_{inner\ tube}$ such that $$r_{table} \leq r_{max} - d\sqrt{\left(1 + \frac{1}{n^2}\right)},$$

with d being the gear thickness and n being the gear transmission ratio.

8. Sample device according to claim 4, wherein the cable support is guided by the supporting means.

9. Sample device according to claim 1 or 7, wherein the gear thickness d is the thickness of the first or second gear and corresponds to the thickness of the inner tube.

10. Sample device according to claim 1 or 7, wherein the gear transmission ratio n corresponds to $r_{inner\ tube}/r_{gear}$, with $r_{gear}=r_{gear1}$ or $r_{gear2}$.

11. Sample device according to claim 2 or 4, wherein the first cable guide comprises at least one first bellow and/or spring between the first and second ends, and wherein the first end is arranged substantially perpendicular to the second end.

12. Sample device according to claim 11, wherein the first bellow and/or spring is guided by a support connected with the outer tube.

13. Sample device according to claim 2 or 4, wherein the cable support is provided with at least one external second bellow and/or spring.

14. Sample device according to claim 1 or 6, wherein the inner tube and/or the outer tube is/are connected to at least one second driving unit.

15. Sample device according to claim 2 or 6, wherein the rotator comprises the inner tube, the outer tube and/or the cable guide connected to at least one driving unit.

16. Sample device according to claim 4, wherein the driving unit comprises at least one stepper engine and/or at least one worm wheel and/or at least one gear.

17. Sample device according to claim 1 or 5, wherein the outer tube is provided with at least one axial extension for supporting the turntable.

18. Sample device according to claim 17, wherein the extension is provided with at least one recess for carrying at least one first bearing.

19. Sample device according to claim 17, wherein the outer tube is provided with two opposite extensions for carrying at least two rotation pins.

20. Sample device according to claim 1 or 6, further comprising a second bearing between the inner tube and the outer tube.

21. Sample device according to claim 1 or 7, wherein the first and second gears are formed as tooth or roll gears.

22. Sample device according to claim 1 or 7, wherein the first gear is machined on or mounted on the inner tube.

23. Sample device according claim 1 or 6, wherein the inner tube is made from carbon fiber and/or provided with chrome plated teeth.

24. Sample device according to claim 1 or 7, wherein the first and/or second gear is/are made of acethal.

25. Sample device according to claim 13, wherein the first and/or second bellow is/are made out of rubber.

26. Sample device according to claim 1 or 5, further comprising at least one thermal isolation layer between the external tube and the outer tube, the thermal isolation layer being evacuated.

27. Sample device according to claim 1 or 6, further comprising means for blowing conditioned air into the external tube entering into the inner or outer tube and exiting the outer or inner tube.

28. Sample device according to claim 14, further comprising a control unit connected to the first and/or second driving unit.

29. Sample device according to claim 28, further comprising at least one test object, at least one sample, at least one sensor, at least one minor, at least one camera, at least one tool and/or at least one electronic device is/are detachably attached to at least one side of the substantially circular plate and/or connected with the control unit.

30. Sample device according to claim 28, wherein the control unit is arranged remote from the turntable, and at least one cable guided at least partially within the first cable guide is provided between the control unit and the turntable.

31. Sample device according to claim 2 or 4, further comprising at least one second cable guide connected to the second end of the first cable guide, the second cable guide being substantially flat and/or flexible.

32. Sample device according to claim 29, wherein the sensor comprises at least one coil and/or at least one magnetic sensor for providing a magnetic calibration device.

33. Sample device according to claim 29, further comprising a source for emitting electromagnetic radiation comprising a laser and/or a visible light source.

34. Sample device according to claim 33, wherein the radiation is guided to the minor and/or camera within the inner tube via at least one glass and/or fiber-optic light guide or waveguide.

35. Sample device according to claim 1 or 6, wherein an amount of turns of the inner tube differs from an amount of turns of the outer tube by one turn within one measuring or calibration cycle.

36. Sample device according to claim 2, wherein the cable support is connected to at least one synchronizing means.

37. Sample device according to claim 2, wherein the cable support is connected to at least one first driving unit.

38. Sample device according to claim 37, wherein the driving unit comprises at least one stepper engine and/or at least one worm wheel and/or at least one gear.

39. Sample device according to claim 4, wherein the cable support is connected to at least one synchronizing means.

40. Sample device according to claim 10, wherein $r_{gear1}=r_{gear2}$ or $r_{gear1}=r_{inner\ tube}$.

41. Sample device according to claim 17, wherein the cable guide is mounted within at least one first bearing.

42. Sample device according to claim 17, wherein a rotation pin connected to the substantially circular plate is mounted within at least one first bearing.

43. Sample device according to claim 1 or 7, wherein the first and second gears are formed as straight and/or conical gears.

44. Sample device according to claim 1 or 7, wherein the second gear is machined on or mounted on the turntable, in particular a support extending substantially perpendicular to the plate and/or substantially coaxially to at least one rotation pin.

45. Sample device according claim 1 or 6, wherein the turntable is made from carbon fiber and/or provided with chrome plated teeth.

46. Sample device according to claim 13, wherein the first and/or second spring is/are made out of non magnetic metal or plastic.

* * * * *

UNITED STATES PATENT AND TRADEMARK OFFICE
CERTIFICATE OF CORRECTION

PATENT NO. : 8,025,260 B2  Page 1 of 1
APPLICATION NO. : 10/585167
DATED : September 27, 2011
INVENTOR(S) : F. Bergsma It is certified that error appears in the above-identified patent and that said Letters Patent is hereby corrected as shown below:

| COLUMN | LINE | ERROR |
|---|---|---|
| 8 (Claim 29, | 35 line 3) | "minor" should read --mirror-- |
| 8 (Claim 34 | 54 line 2) | "minor" should read --mirror-- |

Signed and Sealed this
Fifteenth Day of May, 2012

David J. Kappos
*Director of the United States Patent and Trademark Office*